US009245417B2

(12) United States Patent
Olsen

(10) Patent No.: US 9,245,417 B2
(45) Date of Patent: Jan. 26, 2016

(54) MYSTERY JACKPOT WITH RESTRICTED PAYOUT SYSTEM AND METHOD THEREFOR

(71) Applicant: Eric B. Olsen, Henderson, NV (US)

(72) Inventor: Eric B. Olsen, Henderson, NV (US)

(73) Assignee: Olsen IP Reserve, LLC, Henderson, NV (US)

( * ) Notice: Subject to any disclaimer, the term of this patent is extended or adjusted under 35 U.S.C. 154(b) by 334 days.

(21) Appl. No.: 13/861,559

(22) Filed: Apr. 12, 2013

(65) Prior Publication Data

US 2013/0252721 A1 Sep. 26, 2013

Related U.S. Application Data

(63) Continuation of application No. 13/249,863, filed on Sep. 30, 2011, now Pat. No. 8,430,746.

(51) Int. Cl.
*G06F 17/00* (2006.01)
*G07F 17/32* (2006.01)

(52) U.S. Cl.
CPC .................................. *G07F 17/3258* (2013.01)

(58) Field of Classification Search
USPC ..................................................... 463/16–25
See application file for complete search history.

(56) References Cited

U.S. PATENT DOCUMENTS

| | | | | |
|---|---|---|---|---|
| 6,203,010 | B1 * | 3/2001 | Jorasch et al. | 273/138.1 |
| 8,070,605 | B2 * | 12/2011 | Tien et al. | 463/42 |
| 2006/0052160 | A1 * | 3/2006 | Saffari et al. | 463/27 |

* cited by examiner

*Primary Examiner* — Ronald Laneau
(74) *Attorney, Agent, or Firm* — Lightbulb IP, LLC

(57) ABSTRACT

A mystery jackpot system having an restricted payout scheme allows a mystery jackpot to be incremented by player wagers in a rapid fashion while providing incentives to players to make larger wagers. The mystery jackpot system may have a primary jackpot pool and a secondary jackpot pool. The primary jackpot pool may be funded by eligible wagers, while the secondary jackpot pool may be funded by smaller ineligible wagers. The amount or value of the primary jackpot pool may be used to determine whether the mystery jackpot is active. For example, the mystery jackpot may be active and awardable only if the primary jackpot pool is above a particular amount and below a maximum amount. A player winning the mystery jackpot may be awarded both the primary and secondary jackpot pools. Only players making eligible wagers may win the mystery jackpot.

20 Claims, 4 Drawing Sheets

MYSTERY JACKPOT WITH RESTRICTED PAYOUT SYSTEM AND METHOD THEREFOR

CROSS-REFERENCE TO RELATED APPLICATION

This application is a continuation of U.S. patent application Ser. No. 13/249,863, titled Mystery Jackpot with Restricted Payout System and Method Therefore, filed Sep. 30, 2011, now U.S. Pat. No. 8,430,746.

BACKGROUND OF THE INVENTION

1. Field of the Invention

The invention relates generally to bonuses or jackpots for wagering games, and in particular to a mystery jackpot system having an inclusive funding system.

2. Related Art

Mystery jackpots offer players knowledge that a jackpot will be paid if the jackpot pool is before it reaches a defined maximum value. This is beneficial to gaming establishments because players tend to increase their play and wagers when they are aware that the jackpot is about to hit. Thus, players may increase play and wager size as the jackpot pool approaches the defined maximum value to attempt to win the jackpot. This characteristic of mystery jackpots also benefits players because their enjoyment is increased by the knowledge that they have increased chances to win a jackpot and especially increased if they win the mystery jackpot.

The ability to know that the mystery jackpot is going to hit before a defined maximum value is in contrast to a progressive jackpot which could be awarded virtually at any time. For at least this reason, mystery jackpots are desirable and popular to both players and gaming establishments.

Prior to a mystery jackpot nearing the maximum value however, players may not be enticed by a mystery jackpot since the mystery jackpot is inactive. As such, it may take some time to increase the jackpot pool to meet or exceed the threshold amount to trigger the benefits to the gaming establishment and the players.

From the discussion that follows, it will become apparent that the present invention addresses the deficiencies associated with the prior art while providing numerous additional advantages and benefits not contemplated or possible with prior art constructions.

SUMMARY OF THE INVENTION

A mystery jackpot system having restricted payouts is disclosed herein. The mystery jackpot system allows all player wagers to fund the mystery jackpot, while only allowing particular players to win the jackpot. This is advantageous in that it entices players to attempt to qualify or be eligible for the jackpot, such as by increasing their wager size to become eligible. Though ineligible players contribute to the mystery jackpot, they may not win the mystery jackpot. The mystery jackpot system may have a primary and a secondary jackpot pool to separate funding from eligible and ineligible players. This allows the pools to have independent values and to grow or be incremented independently.

The mystery jackpot system may have a variety of configurations. For instance in one exemplary embodiment a mystery jackpot controller may be provided. Such controller may comprise a communication device configured to receive wager information from one or more gaming machines. The wager information may indicate the type of wager placed at one of the gaming machines. One or more memory devices may be configured to store a mystery jackpot amount comprising at least a first jackpot amount and a second jackpot amount, and an output device may be configured to transmit the first jackpot amount and the second jackpot amount.

For example, these amounts may be transmitted to a display device for presentation to one or more players. The display device may comprise a first numerical indicator and a second numerical indicator. The first numerical indicator may display the first jackpot amount while the second numerical indicator displays the second jackpot amount.

A processor may be configured to determine what type of wager has been placed, increase the first jackpot amount if the wager is a first type of wager, and increase the second jackpot amount if the wager is a second type of wager. The jackpot controller may fund a first and second jackpot pool in this manner. Some or all of the first jackpot amount and the second jackpot amount may be awarded to a player if the wager he or she placed is a first type of wager (e.g., is a wager that allows the player to win the jackpot). In general, the first and second types of wagers are distinguishable from one another based on their characteristics as will be further described in the exemplary embodiments herein.

The processor may be configured to award the mystery jackpot before the primary jackpot amount reaches a maximum value. For instance, the processor may award the mystery jackpot when the primary jackpot amount is above a particular value. Such particular value may be randomly set, such as by a random number generator, to a value less than the maximum value. The first jackpot amount and the second jackpot amount may be decremented by the processor to reflect the payment of funds from the first jackpot amount and the second jackpot.

It is noted that the communication device may send an eligibility indicator to the one of the gaming machines if the wager is a first type of wager. Likewise, the communication device may also send an ineligibility indicator to the one of the gaming machines if the wager is not a first type of wager (e.g., is a second type of wager). In general, the eligibility indicator will indicate to a player that he or she is eligible for the mystery jackpot, while the ineligibility indicator may indicate that the player cannot win the mystery jackpot.

In another exemplary embodiment a mystery jackpot system is provided. Such a system may comprise a mystery jackpot comprising a primary jackpot pool and a secondary jackpot pool with the mystery jackpot being awardable to one or more players based on an amount of funds in the primary jackpot pool. The mystery jackpot will typically be configured to be awarded before the primary jackpot pool reaches a maximum value.

A jackpot controller may be included as well. The jackpot controller may be configured to receive a wager amount associated with one or more first wagers and one or more second wagers, and to determine whether the wager amount is associated with the first or second wagers. The jackpot controller can then increment the primary jackpot pool with the wager amount if the wager amount is associated with a first wager, and increment the secondary jackpot pool with the wager amount if the wager amount is associated with a second wager.

The jackpot controller awards the mystery jackpot by paying funds from both the primary jackpot pool and the secondary jackpot pool to a player that placed a at least one of the first wagers. In this manner, only players that have placed a first wager or first type of wager can win the mystery jackpot.

It is noted that output of a random number generator may be used in awarding the mystery jackpot. For instance the particular threshold may be set by a random number generator. The mystery jackpot may then be awarded or paid out when the amount of funds in the primary jackpot pool when a contribution to the primary jackpot pool increases the primary jackpot pool's value above the predefined value.

One or more gaming machines may be configured to display a first indicator if the player's wager is one of the first wagers and a second indicator if the player's wager is one of the second wagers. The gaming machines may also or alternatively be configured to transmit to the jackpot controller wager information indicating an amount associated with a wager received at the gaming machines. For instance, this amount may by the full amount of the wager and/or a partial amount, such as to indicate the amount to contribute to a jackpot pool.

Also, the gaming machines may be configured to output or present a first announcement and a subsequent second announcement as a result of the mystery jackpot being awarded. The first announcement may be associated with the payment of the first jackpot pool to the player, while the second announcement associated may be with the payment of the second jackpot pool to the player.

In another exemplary embodiment, a method of funding and awarding a mystery jackpot is provided. Such a method may comprise receiving wager information indicating an amount of a wager received at one or more gaming machines, and incrementing a first jackpot pool if the wager is a first type of wager. A second jackpot pool may be incremented if the wager is a second type of wager. The wager information includes information to indicate whether the wager is a first or second type of wager. A wager may be identified and distinguished as a first or second type of wager based on its characteristics. The value of the first jackpot pool and the second jackpot pool may be presented on a display device.

As described above, a mystery jackpot comprising the first jackpot pool and the second jackpot pool may be awarded if the primary jackpot pool is above a predefined value. The mystery jackpot may be awarded by paying funds from the first jackpot pool and the second jackpot pool to a player that has made a wager of the first type. The mystery jackpot may be awarded randomly to such player, such as by setting the predefined value randomly. Payment of funds from the first jackpot pool may be announced followed by a subsequent announcement of payment of the funds from the second jackpot pool.

It is noted that a first indicator may be presented on one of the gaming machines if the wager is a first type of wager and a second indicator may be presented on the one of the gaming machines if the wager is a second type of wager. It is contemplated that the gaming machines may set a maximum permitted wager amount.

In such cases, a first wager may be defined as a wager equal to the maximum permitted wager amount.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, a mystery jackpot with restricted payouts (hereinafter "mystery jackpot system") is disclosed herein. The restricted payout feature increases wager size, while preserving the qualities and characteristics of the mystery jackpot. As will be described further below, all players contribute to the mystery jackpot pool regardless of whether they are eligible or ineligible to win the jackpot pool, while only eligible players can win the jackpot pool. Also, in the mystery jackpot system, eligible wagers may fund a primary jackpot pool while ineligible wagers fund a secondary jackpot pool. Funds from both pools may be paid to a player winning the mystery jackpot. Because ineligible wagers also fund the mystery jackpot (such as by being added to the mystery jackpot's secondary jackpot pool), the mystery jackpot can increase more rapidly than traditional mystery jackpots thus increasing play, wager sizes, and player engagement/entertainment at its associated slot or other wager games.

The mystery jackpot system will now be described with regard to FIG. 1.

Figure 1:
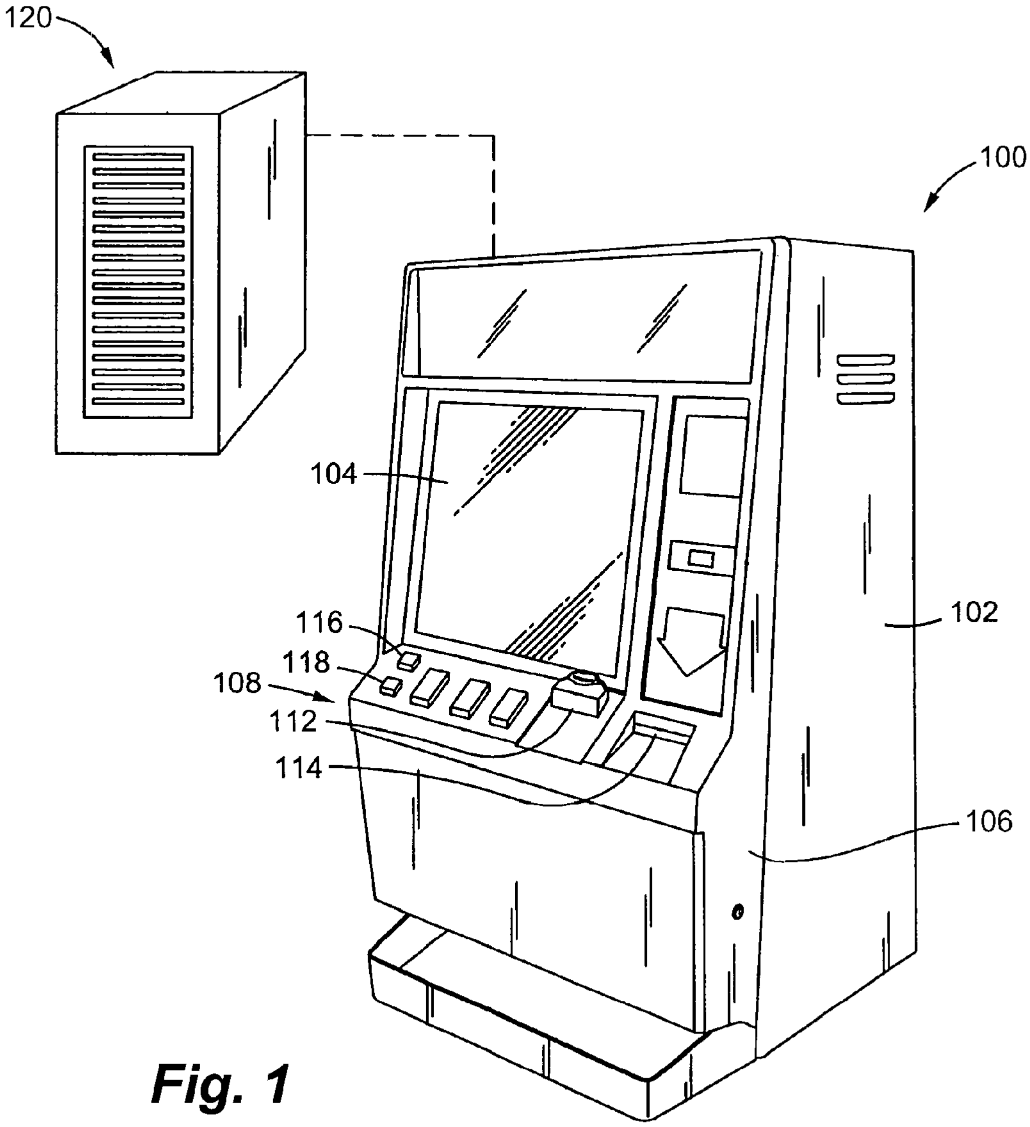
FIG. 1 is a perspective view of an exemplary gaming machine and server.

FIG. 1 illustrates one embodiment of a gaming machine 100 at which the mystery jackpot system may be implemented or used. In one embodiment, the gaming machine 100 may be a wager-based gaming machine configured to present one or more games to a player, which games offer the possibility of an award of winnings Of course, the gaming machine 100 could be configured to present games or amusing activities based upon payment and either not award winnings or offer the opportunity for points, tickets, prizes or the like.

The gaming machine 100 may define a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 may include a door 106 located at a front thereof, the door capable of being moved between an open position which allows access to the interior and a closed position in which access to the interior is generally prevented.

The configuration of the gaming machine 100 may vary. In the embodiment illustrated, the gaming machine 100 has an "upright" configuration. However, the gaming machine 100 could have other configurations, shapes or dimensions (such as being of a "slant"-type or other configuration as is well known to those of skill in the art). It is noted that the configuration of the door 106 may vary, such as dependent upon the configuration of the gaming machine 100.

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED), organic light emitting diode (OLED) display, electronic paper, or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. In one embodiment, the display 104 may be used to present one or more paytables, game symbols, jackpot/payout amounts, bonus game information, etc. . . . associated with the random payout system. It is contemplated that more than one display 104 may be provided in a gaming machine. Each display 104 may present different information. For example, a display 104 may be used to present one or more jackpot amounts while another display is used to present a game.

The gaming machine 100 may be configured to present various styles or configurations of games having the inventive features described herein. These may include games in Class III, such as video poker games, keno, slot-type games, and blackjack or other card, dice or various other games now known or later developed, as well as games in Class II, including central determinant games such a video lottery, bingo and bingo-based games, and other games now known or later developed. The games may also be skill based or include one or more skill components. In one embodiment, certain game outcomes may be designated as winning outcomes. Awards may be provided for winning outcomes, such as monetary payments (or representations thereof, such as award of credits), prizes or the like. As is well known in the art, the number of winning outcomes may vary dependent upon the desired payout or winning percentage offered to the players as compared to wagers that are retained by the gaming establishment.

The gaming machine 100 may include one or more player input devices 108 (such as input buttons, a touch-screen display, joystick, touch-pad or the like) that may be utilized by the player to facilitate game play. The gaming machine 100 may include a coin accepting mechanism 112 for accepting coins and/or a currency or bill acceptor 114 for accepting cash or paper currency. It is also contemplated that other mechanisms now known or later developed may be provided for accepting value for game play, such as credit card, ticket readers or input devices whereby a player may have funds paid from a remote account. The gaming machine 100 may also include a "bet credit" button 118 or the like, such as to permit a player to wager monetary credits credited to the machine.

In one embodiment, the gaming machine 100 may include one or more microprocessors or controllers for controlling the gaming machine, including receiving player input and sending output signals for controlling the various components of the machine 100 (such as generating game information for display by the display 104). The controller may be arranged to send signals for determining winning combinations and to cause the display 104 to display winning amount information. In addition, the controller is preferably arranged to determine if a round of game play has resulted in a win, and if so, the amount to be paid to the player for that win.

The gaming machine 100 may also include a means for paying a player any winnings accumulated during game play. For example, a "cash out" button 116 may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base. Typically when a player cashes out, the player receives either a paper currency voucher or currency in the form of a coin disbursement. If the player decides to receive a coin disbursement, the gaming machine 100 may activate a coin hopper or coin handling device (not shown) which physically counts and delivers the proper number of coins to the player. The coin handling device is commonly configured to transport coins from a supply source (hopper or bin filled with coins) to a coin tray or payout receptacle where the player physically receives the coins. The player might also elect to cash out by having a ticket or other media dispensed, such as via a printer.

The gaming machine 100 may be configured as a stand-alone device or be in communication with one or more external devices at one or more times. For example, the gaming machine 100 may be configured as a server based device and obtain game code or game outcome information from a remote server. The gaming machine 100 may also communicate with one or more gaming servers 120 or external controllers. These one or more gaming servers 120 may be configured to perform accounting, player tracking, bonusing, game generation, random outcome and payout generation, or other functions. As will be described further below for example, the gaming machine 100 may communicate with a jackpot controller to provide bonusing.

Figure 2:
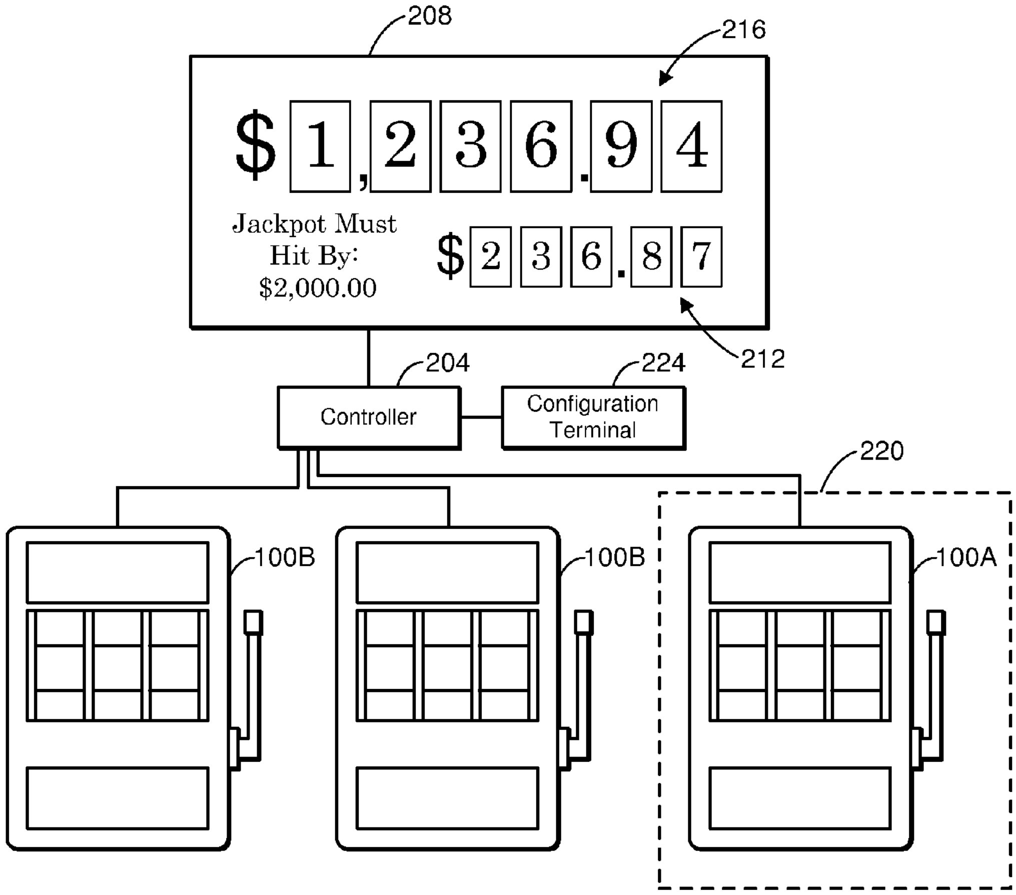
FIG. 2 is a block diagram illustrating an exemplary mystery jackpot system.

FIG. 2 illustrates an exemplary gaming environment including the mystery jackpot system. In one or more embodiments, the mystery jackpot system may comprise a jackpot controller 204 in communication with one or more gaming machines 100. A jackpot display 208 may also be provided, such as to display jackpot awards 212,216 or other jackpot related information. It is noted that the display 208 may be a large community display that presents jackpot awards 212,216 to multiple players. In some embodiments, the jackpot awards 212,216 may also or alternatively be displayed via individual gaming machines 100.

The display 208 will typically present the amount of the mystery jackpot. The display 208 may be an electronic screen for example, such as a LCD, LED, OLED, plasma, or other screen. The display 208 could also or alternatively comprise a LED or other character display configured to present the numbers that represent the size of the mystery jackpot.

As can be seen, the display 208 may present one or more jackpot awards 212,216. Typically, the display 208 will present the amount of a primary jackpot pool 212 and a secondary jackpot pool 216, such as shown in FIG. 2. This allows the primary and secondary jackpot pool 212,216 to be increased at different rates and from different sources, and allows players to see the value of both pools separately, as will be described further below.

It is contemplated that the display 208 may also present the sum of the two jackpot pools 212,216, such as to allow players to easily determine the total amount of the mystery jackpot. The display 208 may also present a "must hit by" value to players. This advertises to players that the mystery jackpot must be awarded to an eligible player before it reaches the must hit by value. As shown in FIG. 2 for example, the mystery jackpot must be awarded before it reaches $2,000.00. In addition, the display 208 may clearly indicate to players that only players making eligible wagers will be eligible for the mystery jackpot. This is advantageous in that it encourages players to increase their wager size to become eligible for the mystery jackpot, which includes a payout from both the primary and secondary jackpot pools 212,216.

The jackpot controller 204 may communicate wager information with one or more gaming machines 100. For example, the amount a player wagers may be shared between a gaming machine 100 and the jackpot controller 204. The jackpot controller 204 may use this information to fund one or more jackpot pools, such as by sending a portion of a wager to a particular jackpot pool. When a jackpot pool is increased or decreased, the jackpot controller 204 may present the amount of the jackpot pool to players, such as via a display 208.

As stated, the mystery jackpot system herein may support a primary and secondary jackpot pool. Accordingly, the jackpot controller 204 may support multiple jackpot pools. As shown in FIG. 2 for example, the amount of a primary jackpot 212 and the amount of a secondary jackpot 216 are presented via a display 208 by the jackpot controller 204. The jackpot controller 204 will typically be configured to fund these pools independently so that they may, but need not always, be funded for different reasons. As will be described further below, eligible wagers may be used to fund a primary jackpot pool, while ineligible wagers may fund a secondary jackpot pool. This is beneficial because both eligible and ineligible wagers contribute to the mystery jackpot. However, only players making eligible wagers may be given the opportunity to win (and actually win) the mystery jackpot.

FIG. 2 illustrates this concept generally. In FIG. 2, the dashed line 220 signifies a gaming machine 100A where wagers below a qualifying threshold amount (i.e., ineligible wagers) are being placed. This means that the player at gaming machine 100A does not qualify for the mystery jackpot offered by the mystery jackpot system. In contrast, in this example, players at the other gaming machines 100B are making qualifying wagers, such as max bet wagers, which make them eligible for the mystery jackpot.

Figure 3:
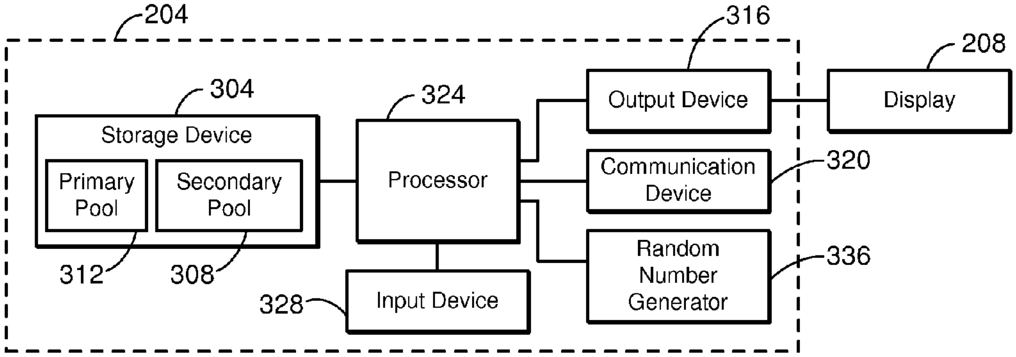
FIG. 3 is a block diagram illustrating an exemplary jackpot controller.

FIG. 3 illustrates an embodiment of an exemplary jackpot controller 204 of the mystery jackpot system. As can be seen, the jackpot controller 204 may comprise one or more processors 324, communications devices 320, and memory devices 304. The jackpot controller 204 may also include one or more input devices 328 and output devices 316. A communications device 320 may be used to communicate data between the jackpot controller 204 and other devices, such as gaming machines or configuration terminals (for configuring the jackpot controller). For instance, wagering information may be communicated between gaming machines and the jackpot controller 240 via a communication device.

An input device 328 may be used to receive input such as to configure the jackpot controller. For example, and input device may be a button, switch, keyboard, mouse, or the like through which a user may interact with the jackpot controller 204. An output device 316 may be used to send output to a user or device. For example, an output device may be a screen, light, speaker, or other device for providing audio, visual, or other output to a user. The output device 316 could also or alternatively be an interface, such as a video and/or audio output or the like to provide a signal/output for presentation through another device. For example, as shown in FIG. 3, the output 316 of the jackpot controller 204 may be connected to a display 208, such as to display jackpot pool amounts to players.

A processor 324 may be configured to control or orchestrate the other components of the jackpot controller 204, such as to fund/increment jackpot pools, make payouts from the pools, display jackpot pool amounts, and provide other functionality of the mystery jackpot system herein. The processor 324 may be configured to execute one or more instructions, such as in the form of machine readable code, to provide the functionality disclosed herein.

The instructions or machine readable code may be stored on a memory or storage device 304 in one or more embodiments. For example, the instructions or machine readable code may be stored on RAM, ROM, magnetic mediums, flash memory, optical mediums, or the like. The instructions or machine readable code may be retrieved from the storage device 304 for execution by the processor 324. In addition, the storage device 304 may be used to store data resulting from or required by execution of the instructions or machine readable code. For example, the storage device 304 may store wager information indicating the amount of a wager, as well as the current amount of a jackpot pool, such as the primary or secondary pool. The processor 324 may add to or subtract from these values to fund and payout the pool, as will be described further below.

As shown in FIG. 3, the storage device 304 stores data comprising information relating to a primary jackpot pool 312 and a secondary jackpot pool 308. In this manner, the funding for the primary jackpot pool 312 and the secondary jackpot pool 308 may be kept separated from one another. This allows the pools 312,308 to be funded independently and to have different amounts. In this manner, eligible wagers can fund a primary jackpot pool 312, while ineligible wagers fund a secondary jackpot pool 308.

In operation, the processor 324 may receive wager information from one or more gaming machines via a communication device 320. The wager information may comprise the amount wagered by a player at one of the gaming machines. The processor 324 may be configured to compare the wager amount to a predefined threshold value. If the wager meets this threshold, the wager may be deemed eligible. If not, the wager may be deemed ineligible. The eligibility or ineligibility of a wager may be reported back to the gaming machine at which the wager was placed. The gaming machine may then present the player's eligibility status to the player.

A portion of eligible wagers may be added to a primary jackpot pool 312, while a portion of ineligible wagers may be added to a secondary jackpot pool 308 by the processor 324. Both pool amounts may then be stored on the storage device 304 and/or presented such as via an output 316, display 208, or both.

A processor 324 may also be configured to determine if the mystery jackpot should be awarded. In one or more embodiments, the mystery jackpot may be awarded to an eligible player that causes the primary jackpot pool 312 to meet or exceed a threshold value. In other words, the player whose wager (or portion thereof) that causes the primary jackpot pool 312 to meet or exceed the threshold value may be awarded the mystery jackpot. An ineligible player that causes the primary jackpot pool 312 to meet or exceed the threshold value would not win the mystery jackpot. In such case, the player who places the next eligible wager may be awarded the mystery jackpot. Alternatively, the threshold may be reset to another value.

The threshold value may be a random value, and may be reset after the mystery jackpot has been paid out to a player. The processor 324 and/or one or more random number generators 336 may be used to generate and reset the threshold value.

When a player wins the mystery jackpot, the processor 324 may be configured to decrement funds from both the primary and secondary jackpot pools 312,308 to pay the jackpot to the winning player. The processor 324 may also update the display 208 to reflect the now lower values for both jackpot pools.

Figure 4:
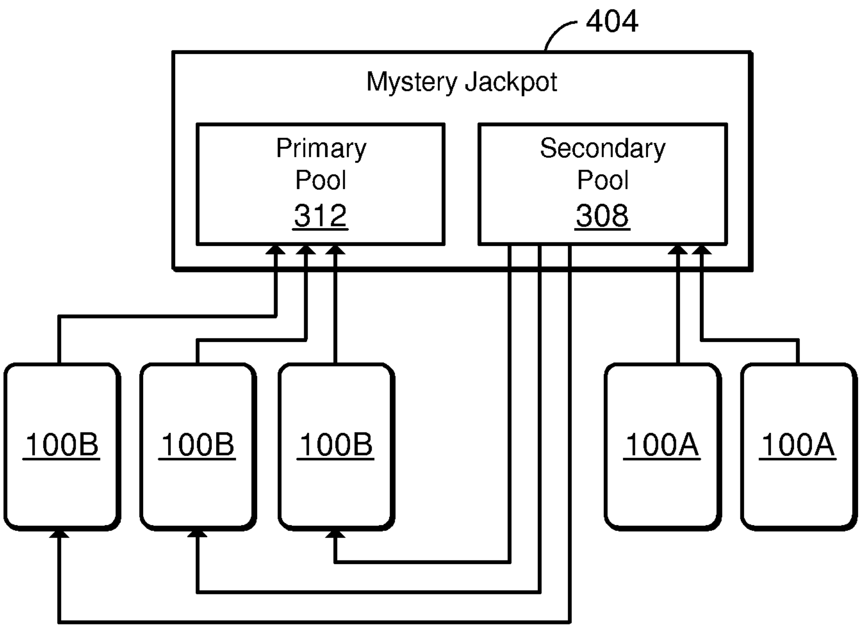
FIG. 4 is a block diagram illustrating funding operations of an exemplary mystery jackpot system.

FIG. 4 illustrates additional details of an exemplary mystery jackpot system with its mystery jackpot 404 and its associated gaming machines 100. As can be seen the mystery jackpot 404 comprises a primary and secondary jackpot pool 312,308. The arrows into and out of the primary and secondary jackpot pools 312,308 indicate the flow of funds to and from the jackpot pools. As shown in FIG. 4, players at gaming machines 100A are placing ineligible wagers while players at gaming machines 100B are placing eligible wagers. The resulting differences in operation of the mystery jackpot system will now be described.

As can be seen, ineligible wagers from gaming machines 100A are used to fund a secondary jackpot pool 308, such as by taking or diverting a portion of the wager to fund the pool. It is contemplated that the entire amount of an ineligible wager could be used to fund the secondary jackpot pool 308 in some embodiments. The arrows of FIG. 4 show that no funds from either the primary jackpot pool 312 or the secondary jackpot pool 308 are paid or returned to players making ineligible wagers located at gaming machines 100A. Therefore the payout of the mystery jackpot is restricted to eligible players only.

As can also be seen, eligible wagers from gaming machines 100B are used to fund a primary jackpot pool 312. Like ineligible wagers, funding from eligible wagers may occur by taking a portion of the eligible wagers to fund the primary jackpot pool 312. As stated, unlike ineligible wagers, players making eligible wagers may win the mystery jackpot. Thus, as the arrows of FIG. 4 show, funds can be paid to players at gaming machines 100B from either or both the primary jackpot pool 312 and the secondary jackpot pool 308. Typically, as will be described below, an eligible player winning the mystery jackpot would win funds from the primary jackpot pool 312 as well as the secondary jackpot pool 308. Thus, a jackpot winner may be said to receive a primary award (from the primary pool 312) and a bonus award (from the secondary pool 308). This is advantageous in that players will be enticed to place larger wagers to become eligible for the mystery jackpot.

Figure 5:
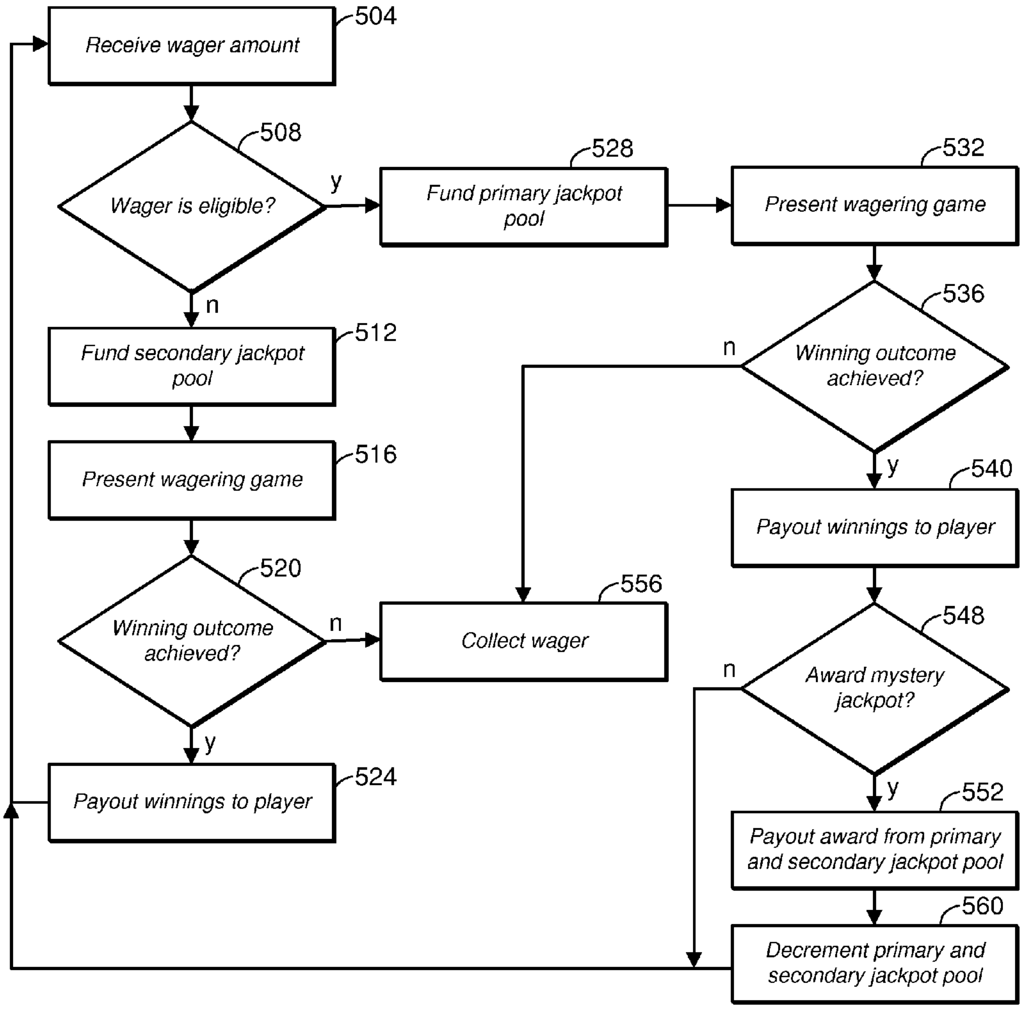
FIG. 5 is a flow diagram illustrating operation of an exemplary mystery jackpot system.

Further details regarding operation of the mystery jackpot system will now be described with regard to the flow diagram of FIG. 5. In one or more embodiments, the jackpot controller of the mystery jackpot system may perform these operations. Presentation of wagering games any physical provisioning of payouts, such as tokens, currency, vouchers/tickets, or the like may be performed by gaming machines. In addition, it is contemplated that a gaming machine may have its own mystery jackpot, and in such cases the gaming machine's controller or other hardware may perform these operations to provide the mystery jackpot disclosed herein.

Though described as a single level bonus/jackpot, it is contemplated that the mystery jackpot system herein may support multi-level jackpots, where primary and secondary jackpot pools are provided for each level and funded/paid out as disclosed herein.

At a step 504, a wager amount may be received, such as from one or more gaming machines. For example, in one embodiment, a gaming machine may transmit the amount of a player's wager for receipt by the jackpot controller. At a decision step 508, it may be determined whether or not the wager amount makes the player eligible for the jackpot. This may occur in various ways.

For example, the player may be deemed eligible if the wager amount meets or exceeds a particular eligibility threshold or value. This threshold value may be set on a per game basis or as a global parameter, such as via the jackpot controller or at gaming machines themselves. The threshold amount may vary. For example, the threshold may be set to equal the maximum possible wager. In this manner, a player that has made the maximum possible bet may be deemed eligible for the mystery jackpot in one or more embodiments, while other player would be deemed ineligible. In other embodiments, the threshold may be less than the maximum wager or "max bet" amount.

Eligibility may be determined in other ways as well. For example, a threshold number of unit wagers, if made, could make a player eligible for the mystery jackpot. Alternatively or in addition, a minimum ratio of the maximum wager could be used to determine eligibility, where wagers meeting or exceeding this ration would grant eligibility.

If the player is not eligible at decision step 508, then the process may continue at a step 512 where a secondary jackpot pool may be funded from the ineligible wager. For example, a percentage or other portion of the wager may be used to increase the secondary jackpot pool. A display may then be updated to reflect the increase to the secondary jackpot pool so that the current amount of the secondary jackpot pool is readily viewable.

It is noted that the player may be informed or notified one or more times of their eligibility and/or ineligibility. For example, an audio and/or visual indicator may be presented to a player at his or her gaming machine, such as through a speaker, light, screen, or other output device of the gaming machine. This helps ensure that the player is aware of his or her eligibility status. The gaming machine may present a persistent or permanent indicator of eligibility in some embodiments. For example, a sign or electronic display may indicate what wager amount(s) would make the player eligible for the mystery jackpot. In one or more embodiments, the player may also be presented information to inform the player that both ineligible and eligible wagers fund the mystery jackpot, but only players making eligible wagers can win the jackpot.

At a step 516, a wagering game may be presented. Typically, the wagering game will be presented by a gaming machine, such as those described above. Various types of wagering games may be presented, including slot games, video poker games, keno, bingo, or others. The wagering games may have multiple dealing and/or betting rounds in some embodiments. Similar to the initial wager, a percentage or other portion of these additional wagers (placed during the wagering game) may be used to fund the secondary jackpot pool if below a particular threshold (and as will be described below, used to fund a primary jackpot pool if the same as or above a particular threshold). Alternatively, the additional wagers may not be used to fund the mystery jackpot at all (i.e., not used to fund any jackpot pool). In other embodiments, a portion of the additional wagers may only be used to fund the secondary jackpot pool since the initial wager was ineligible.

After a wagering game has been presented at step 516, it may be determined if a winning outcome was achieved at a decision step 520. A winning outcome may be determined based on the rules of the wagering game being played. If the player has a winning outcome he or she may be paid an award at a step 524. This may occur by dispensing tokens or currency, issuing payment vouchers/tickets, or by crediting the player for example. The process may then continue at step 504 where a wager to play the wagering game again may be received. If the player does not achieve a winning outcome at decision step 520, then the player's wager(s) may be collected by the gaming establishment at a step 556.

Referring back to decision step 508, if the wager is eligible for the mystery jackpot, a percentage or other portion of the eligible wager may be used to fund a primary jackpot pool at a step 528. Similar to step 516, a wagering game may then be presented at a step 532, such as on a gaming machine. Any additional wagers made during the wagering game may, but need not, be used to fund the mystery jackpot in some embodiments. For example, a percentage or other portion of the additional wagers may be used to fund the primary jackpot pool. Alternatively, a portion of the additional wagers may be used to fund the primary jackpot pool if above or the same as a particular threshold amount and used to fund the secondary jackpot pool if below that amount.

At a decision step 536 it may be determined if the player has received a winning outcome. This may occur based on the rules of the wagering game that was presented at step 532. If a winning outcome was not achieved, the player's wager(s) may be collected by the gaming establishment at step 556. If a winning outcome was achieved, the player may be paid his or her winnings at a step 540. As described above, this may occur by crediting the player, dispensing tokens or currency, issuing payment vouchers/tickets or the like.

Here, since the player has made an eligible wager, it may be determined if the player will or will not be awarded the mystery jackpot. It is noted that though illustrated as occurring after the payout step 540, in some embodiments awarding the mystery jackpot may occur even if the player does not achieve a winning outcome at decision step 536.

At a decision step 548 whether or not the player has won a jackpot. This may occur by comparing the primary jackpot pool's value as a result of the player's contribution to the predefined threshold value for the mystery jackpot. If the primary jackpot pool's value meets or exceeds this threshold value, the player may be deemed a winner and be paid the mystery jackpot, as will be described in the following. If not, no award is paid and the process may return to step 504 where another wager may be received, such as to start a new game.

If the player does win the jackpot at decision step 548, the player may be paid a jackpot award at a step 552. As stated, the jackpot award may comprise funds from both the primary jackpot pool and the secondary jackpot pool. In this manner, the player receives a primary jackpot award and a secondary or bonus jackpot award. As disclosed above, the primary jackpot pool may be funded by eligible wagers while the secondary jackpot pool is funded by ineligible wagers. Only players that have made eligible wagers can win the jackpot, and when the do win, they win funds from both the primary and secondary jackpot pools.

A jackpot winner may be awarded all or substantially all of both the primary and secondary jackpot pools. This is shown by a step 560, where both the primary and secondary jackpot pools are decremented as a result of making payment to the jackpot winner. It is noted that in some embodiments, a base or reset level of funds may be preserved in either or both the primary and secondary jackpot pools when making payment to the jackpot winner. This ensures a base level jackpot amount for subsequent games.

It is contemplated that the payout from each pool may be signified separately to increase player satisfaction and to ensure that players know that they have been awarded from the primary jackpot pool as well as a secondary jackpot pool. For example, a first and second announcement, such as an audio and/or visual display may be initiated to signify payment from the two separate jackpot pools. The second announcement may take place after the first announcement has completed. In some embodiments, the second announcement may be delayed for a period of time after the first announcement has ended, such as to increase the player's surprise at also winning the secondary jackpot pool.

It is contemplated that variations on the payout methodology provided by the mystery jackpot system may be implemented. For instance, in one embodiment, all players may be eligible to win the primary jackpot pool, while only eligible players that win the primary jackpot pool would be awarded the secondary jackpot pool.

As can be seen, the mystery jackpot system herein increases the size of a mystery jackpot by incrementing a primary jackpot pool with eligible wagers and incrementing a secondary jackpot pool with ineligible wagers. The increasing size of the secondary jackpot pool may cause players to increase their wager sizes so that they are eligible for the mystery jackpot (which includes funds from both the primary and secondary jackpot pools). Also, the secondary jackpot pool provides further enticement for players to play one or more gaming machines associated with the mystery jackpot system.

In addition, the mystery jackpot system's payouts are controlled by the size of the primary jackpot pool. As can be seen from the above, the ability to win a jackpot of the mystery jackpot system may be determined solely on the value of the primary jackpot pool without regard to the amount of the secondary jackpot pool. Therefore, the primary jackpot pool controls the payout from itself as well as the secondary jackpot pool.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A mystery jackpot controller comprising:

a communication device configured to receive wager information from one or more gaming machines;

one or more memory devices configured to store a mystery jackpot amount comprising at least a first jackpot amount and a second jackpot amount;

a random number generator that generates a random threshold value;

a processor configured to:

determine whether or not a wager is a first type of wager or a second type of wager based on the wager information;

increase the first jackpot amount if the wager is of the first type;

increase the second jackpot amount if the wager is of the second type; and before the first jackpot amount reaches the random threshold value, award at least a portion of the mystery jackpot amount to a player if the wager is of the first type and not the second type.

2. The mystery jackpot controller of claim 1, wherein the communication device is configured to communicate an eligibility indicator to the one of the one or more gaming machines if the wager is of the first type.

3. The mystery jackpot controller of claim 1, wherein the communication device is configured to communicate an ineligibility indicator to the one of the one or more gaming machines if the wager is of the second type.

4. The mystery jackpot controller of claim 1 further comprising a display device comprising a first numerical indicator and a second numerical indicator, wherein the output device is connected to the display device and the first numerical indicator displays the first jackpot amount while the second numerical indicator displays the second jackpot amount.

5. The mystery jackpot controller of claim 4, wherein the display device also displays the maximum value.

6. The mystery jackpot controller of claim 1, wherein the processor is configured to award the at least a portion of the mystery jackpot amount if the primary jackpot amount increases to a particular value, wherein the particular value is less than the maximum value.

7. The mystery jackpot controller of claim 1, wherein the processor is further configured to decrement the first jackpot amount and the second jackpot amount after the at least a portion of the mystery jackpot amount has been awarded.

8. A mystery jackpot system comprising:

a mystery jackpot comprising a primary jackpot pool and a secondary jackpot pool stored on one or more memory or storage devices, the mystery jackpot being awardable to one or more players based on an amount of funds in the primary jackpot pool;

one or more gaming machines that present one or more wagering games, the one or more gaming machines comprising one or more wager accepting mechanisms that receive one or more first wagers and one or more second wagers, wherein the one or more first wagers and the one or more second wagers are distinct types of wagers; and a jackpot controller configured to:

receive via communication with the one or more gaming machines a wager amount associated with the one or more first wagers and the one or more second wagers;

determine whether the wager amount is associated with the one or more first wagers or the one or more second wagers;

increment the primary jackpot pool with the wager amount if the wager amount is associated with the one or more first wagers;

increment the secondary jackpot pool with the wager amount if the wager amount is associated with the one or more second wagers; and award the mystery jackpot by paying both the primary jackpot pool and the secondary jackpot pool to a player that placed at least one of the one or more first wagers.

9. The mystery jackpot system of claim 8, wherein the one or more gaming machines display on a display screen an eligibility indicator when the one or more first wagers are received and an ineligibility indicator when the one or more second wagers are received.

10. The mystery jackpot system of claim 8, wherein the jackpot controller is configured to store a maximum value for the primary jackpot pool and award the mystery jackpot before the primary jackpot pool equals the maximum value.

11. The mystery jackpot system of claim 8, wherein the one or more gaming machines determine whether a wager received at the one or more gaming machines is one of the one or more first wagers or is one of the one or more second wagers.

12. The mystery jackpot system of claim 8 further comprising a display device configured to present an amount of funds in the primary jackpot pool and an amount of funds in the secondary jackpot pool to the one or more players.

13. The mystery jackpot system of claim 8 further comprising a random number generator, wherein the mystery jackpot is awarded only if the amount of funds in the primary jackpot pool is above a threshold value that is randomly generated by the random number generator.

14. The mystery jackpot system of claim 8, wherein the one or more gaming machines output a visible or audible first announcement and a subsequent visible or audible second announcement as a result of the mystery jackpot being awarded, the first visible or audible announcement associated with payment of funds from the first jackpot pool to the player, the visible or audible second announcement associated with payment of funds from the second jackpot pool to the player.

15. A method of funding and awarding a mystery jackpot jackpot controller comprising:

receiving wager information from one or more gaming machines via a communications interface, the wager information indicating whether a wager received at the one or more gaming machines is of a first type or a second type;

incrementing a first jackpot value if the wager is of the first type, the first jackpot value stored on one or more memory devices;

incrementing a second jackpot value if the wager is of the second type, the second jackpot value stored on the one or more memory devices;

randomly generating a predefined value with a random number generator;

providing a mystery jackpot comprising the first jackpot value and the second jackpot value, wherein the mystery jackpot is payable when the primary jackpot pool is above the predefined value and below a maximum value;

awarding the mystery jackpot by decrementing funds from the first jackpot pool and the second jackpot pool and transmitting instructions via the communications interface to at least one of the one or more gaming machines to dispense the funds to a winning player, the winning player being a player that has made a wager of the first type.

16. The method of claim 15 further comprising presenting a first visible or audible indicator via one of the one or more gaming machines if the wager is of the first type and presenting a second visible or audible indicator via the one of the one or more gaming machines if the wager is of the second type.

17. The method of claim 15 further comprising presenting the first jackpot value and the second jackpot value on a display device.

18. The method of claim 15 further comprising announcing payment of funds from the first jackpot pool, and subsequently announcing payment of the funds from the second jackpot pool via an output device.

19. The method of claim 15, wherein the one or more gaming machines have a maximum permitted wager amount, and a wager of the first type is any wager equal to the maximum permitted wager amount.

20. The method of claim 19, wherein a wager of the second type is any wager less than the maximum permitted wager amount.

* * * * *